(12) United States Patent
Domahidy

(10) Patent No.: US 8,662,519 B2
(45) Date of Patent: Mar. 4, 2014

(54) INTERNAL CABLE ROUTING SYSTEM

(75) Inventor: Steve Domahidy, Highlands Ranch, CO (US)

(73) Assignee: Niner, Inc., Fort Collins, CO (US)

( * ) Notice: Subject to any disclaimer, the term of this patent is extended or adjusted under 35 U.S.C. 154(b) by 319 days.

(21) Appl. No.: 13/184,099

(22) Filed: Jul. 15, 2011

(65) Prior Publication Data

US 2012/0011957 A1   Jan. 19, 2012

Related U.S. Application Data

(60) Provisional application No. 61/365,269, filed on Jul. 16, 2010.

(51) Int. Cl.
B62J 6/18 (2006.01)
B62J 11/00 (2006.01)
B62K 19/30 (2006.01)

(52) U.S. Cl.
USPC ........................... 280/288.4; 280/288.3

(58) Field of Classification Search
USPC ................. 280/281.1, 288.3, 288.4
See application file for complete search history.

(56) References Cited

U.S. PATENT DOCUMENTS

| 4,585,246 | A * | 4/1986 | Diekman et al. | 280/281.1 |
| 4,768,798 | A * | 9/1988 | Reed et al. | 280/281.1 |
| 4,915,404 | A * | 4/1990 | Chonan | 280/288.3 |
| 7,114,738 | B1 * | 10/2006 | Chen | 280/281.1 |
| 7,854,442 | B2 * | 12/2010 | Onogi et al. | 280/288.3 |
| 2011/0067200 | A1 * | 3/2011 | Beistegui Chirapozu | 16/2.1 |
| 2011/0115193 | A1 * | 5/2011 | Giroux | 280/281.1 |
| 2011/0121538 | A1 * | 5/2011 | Giroux | 280/280 |
| 2012/0247263 | A1 * | 10/2012 | Chubbuck | 74/502.6 |

FOREIGN PATENT DOCUMENTS

GB    2162803 A * 2/1986

* cited by examiner

Primary Examiner — Paul N Dickson
Assistant Examiner — Daniel Yeagley
(74) Attorney, Agent, or Firm — Alleman Hall McCoy Russell & Tuttle LLP

(57) ABSTRACT

An internal cable system for a bicycle is disclosed herein. The system is configured such that vibration between one or more cables and a bicycle frame is reduced. As such, riders are able to navigate through rugged terrain without experiencing increased noise due to internal cable vibration against the bicycle frame.

19 Claims, 2 Drawing Sheets

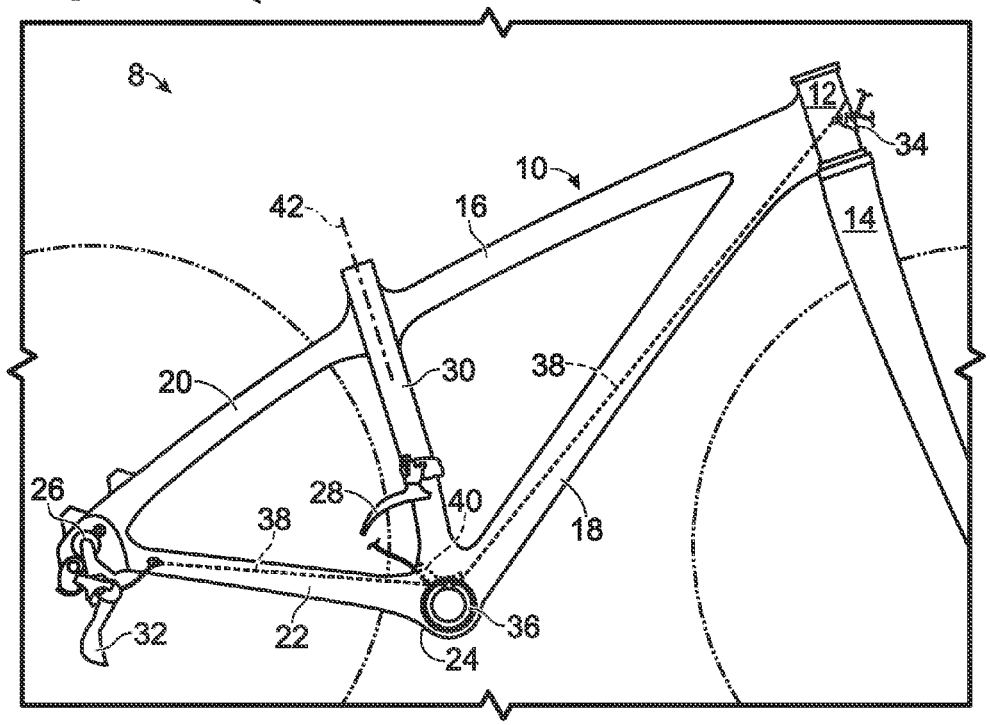
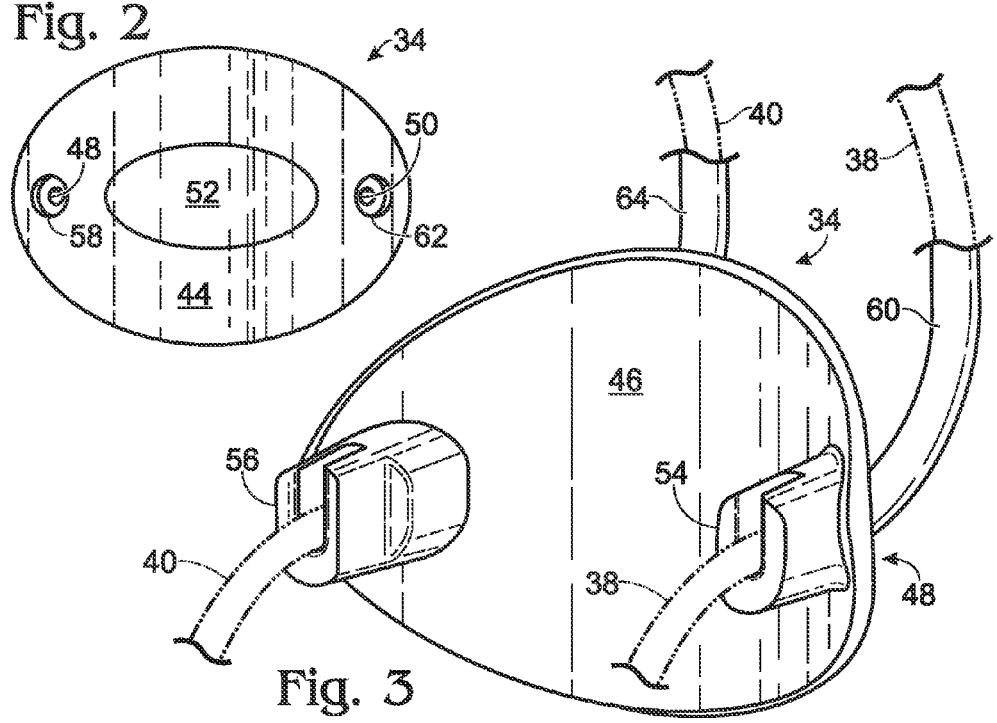

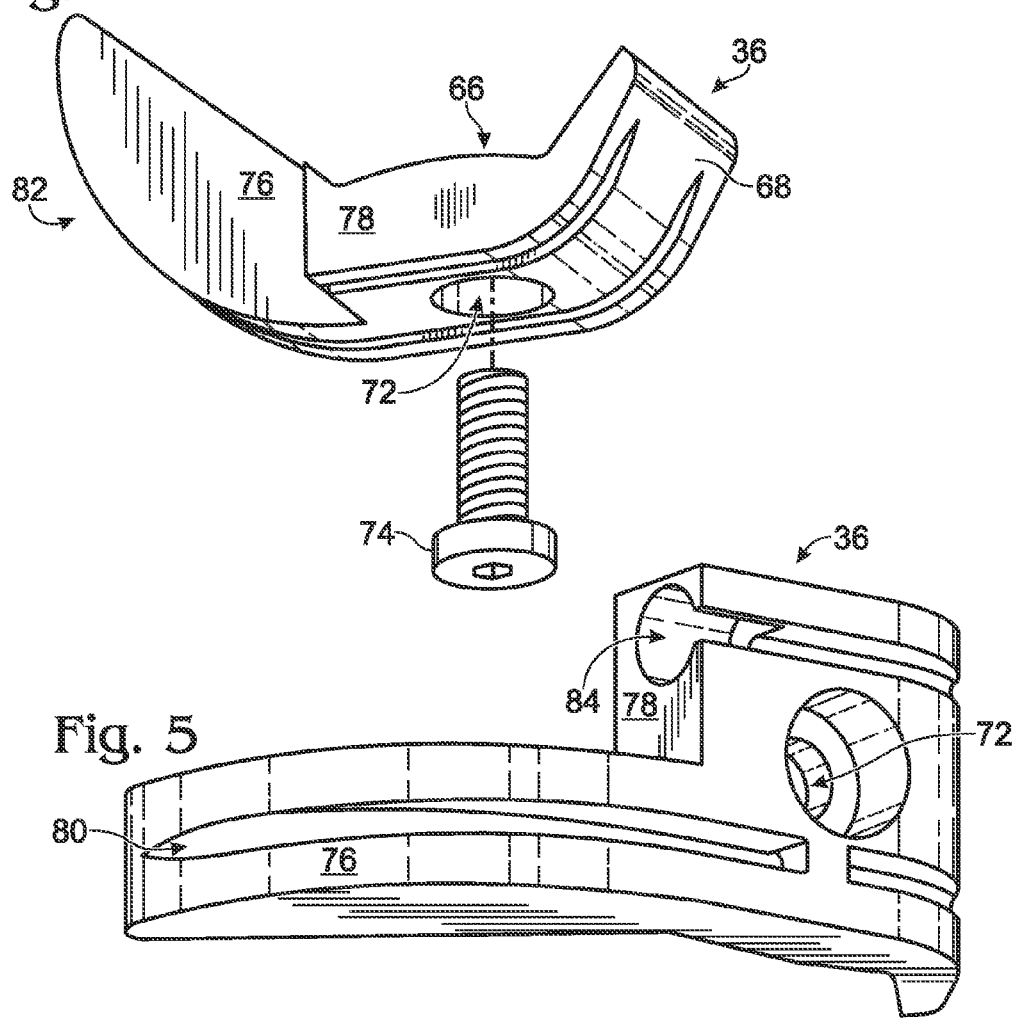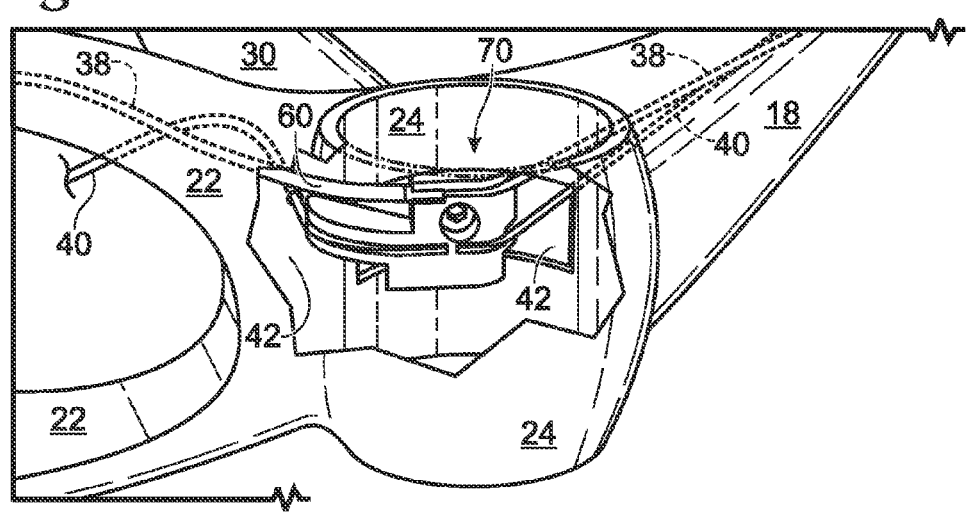

INTERNAL CABLE ROUTING SYSTEM

CROSS REFERENCE TO RELATED APPLICATION

This application claims priority to U.S. Provisional Patent Application No. 61/365,269, entitled "Internal Cable Routing System", filed Jul. 16, 2010, the entirety of which is hereby incorporated by reference for all purposes.

BACKGROUND

Externally located bicycle cables are susceptible to damage, can increase aerodynamic drag, and are not aesthetically pleasing.

SUMMARY

An internal cable system for a bicycle is disclosed. The described system includes a cable routing head badge and/or guides that decrease contact between the cable and the frame.

BRIEF DESCRIPTION OF THE DRAWINGS

FIG. 1 shows a cable routing system in accordance with an embodiment of the present disclosure.

FIG. 2 shows a front view of a head badge portion of the cable routing system of FIG. 1.

FIG. 3 shows a rear view of the head badge of FIG. 2.

FIG. 4 shows a cable routing chuck portion of the cable routing system of FIG. 1.

FIG. 5 shows a perspective view of a cable routing chuck of FIG. 4.

FIG. 6 shows the cable routing chuck of FIG. 4 mounted within a bicycle bottom bracket.

DETAILED DESCRIPTION

The following disclosure is directed to an internal cable routing system for a cycle. While the examples provided herein focus on internally routing derailleur cables in a mountain bicycle, it is to be understood that virtually any type of cable (e.g., brake cable, seat post height adjustment cable, etc.) may be internally routed in accordance with the teachings of this disclosure. Furthermore, the system may be used with any type of cycle, including but not limited to, road bicycles, mountain bicycles, recumbent bicycles, recreational bicycles, motorcycles, and tricycles.

FIG. 1 shows a nonlimiting example of an internal cable routing system 6 of a bicycle 8. Bicycle 8 includes a cycle frame 10 with head tube 12, fork 14, top tube 16, down tube 18, seat tube 30, seat stays 20, and chain stays 22. Further, cycle frame 10 includes bottom bracket shell 24 at an intersection of down tube 18 and chain stays 22, and cycle frame 10 includes dropout 26 at an intersection of seat stays 20 and chain stays 22. Front derailleur 28 may be coupled to seat tube 30 and rear derailleur 32 may be coupled to dropout 26.

Cable routing system 6 includes cable routing head badge 34, cable routing chuck 36, and cables 38 and 40. Some components of cable routing system 6 may be located within interior cavity 42 of cycle frame 10. For example, cable routing chuck 36 may be located within interior cavity 42 near bottom bracket shell 24. Further, some components of cable routing system 6 may be located externally, on the outside of cycle frame 10. For example, cable routing head badge 34 may be located primarily on the external surface of head tube 12. Also, some components may be partially located within interior cavity 42 and partially located external to cycle frame 10. For example, cables 38 and 40 may be configured such that portions are located within interior cavity 42 and other portions are located external to cycle frame 10. Portions of cables 38 and 40 that are located external to cycle frame 10 are drawn with solid lines, while portions of cables 38 and 40 located within interior cavity 42 are drawn with dashed lines. As shown, external portions of cables 38 and 40 may be located substantially close to head badge 34, front derailleur 28, and/or rear derailleur 32, for example.

Cables 38 and 40 may be any suitable material, including twisted or braided strands of steel. It will be appreciated that cable routing system 6 may include more than one cable. For example, cable routing system 6 may have one cable to actuate front derailleur 28 (e.g., cable 40) and another cable to actuate rear derailleur 32 (e.g., cable 38). As another example, cable routing system 6 may additionally or alternatively include one or more brake or other types of cables.

Cables 38 and 40 may be bare or covered with cable housing. In some embodiments, the cables may be bare in some portions while covered by cable housing in other portions. For example, a cable may be covered with cable housing where external to cycle frame 10, while bare within interior cavity 42. It will be appreciated that the cable may be bare in portions external to cycle frame 10. Further, it will be appreciated that the cable may be covered with a housing when within interior cavity 42.

Components of cable routing system 6 are further discussed with respect to FIGS. 2-6. FIG. 2 shows a front view of cable routing head badge 34 and FIG. 3 shows a rear view of cable routing head badge 34. FIGS. 4-6 show various perspectives of cable routing chuck 36.

Turning first to FIGS. 2 and 3, cable routing head badge 34 includes front face 44, rear face 46, and one or more apertures extending through front face 44 and rear face 46. For example, head badge 34 may include a first aperture 48 and a second aperture 50. As described above, cable routing head badge 34 may be coupled to an external surface of head tube 12. As such, head tube 12 may be configured to receive the removable and replaceable head badge 34.

Front face 44 of head badge 34 may include an identification area 52, which may be positioned between first aperture 48 and second aperture 50. In another example, identification area 52 may be positioned elsewhere on head badge 34. It is common practice within the bicycle industry to include a decorative mark on the head tube of the bicycle so that the brand of the bicycle can be easily identified by consumers. Identification area 52 is adapted to display such a mark.

Rear face 46 of head badge 34 may have a shape configured to closely conform to head tube 12 when head badge 34 is mounted to head tube 12. Rear face 46 may include one or more ports 54 and 56 in communication with first and second apertures 48 and 50.

First and second apertures 48 and 50 may be configured to receive cables and thus permit passage of the cables into interior cavity 42. For example, first aperture 48 may extend through front face 44 and rear face 46 of head badge 34 to allow the passage of cable 38 through first aperture 48. Likewise, second aperture 50 may extend through front face 44 and rear face 46 of head badge 34 to allow the passage of cable 40 through second aperture 50. In this way, each cable may transition between the exterior of the bicycle frame and the interior of the bicycle frame.

First aperture 48 may include first port 54 and first housing stop 58. First aperture 48 may be positioned to align with a first opening (not shown) of head tube 12 when head badge 34 is mounted to head tube 12. In this way, cable 38 extending from outside cycle frame 10 may pass through first aperture 48 to be admitted through the head tube 12 and into interior cavity 42 of cycle frame 10.

First port 54 may extend away from rear face 46 of head badge 34. If head badge 34 is mounted to head tube 12, first port 54 may be sized to extend past the interior wall of the head tube. Further, first port 54 may be configured to guide cable 38 such that cable 38 does not touch the interior wall of head tube 12 and/or such that cable 38 does not touch the steerer tube of fork 14.

First housing stop 58 may be configured to receive an end of first cable housing 60 without allowing first cable housing 60 to be admitted completely through first aperture 48. As such, cable 38 may pass through down tube 18 as a bare cable.

Similar to the above description for first aperture 48, second aperture 50 may include second port 56 and second housing stop 62. Second aperture 50 may be positioned to align with a second opening (not shown) of head tube 12 when head badge 34 is mounted to head tube 12. In this way, cable 40 extending from outside cycle frame 10 may pass through second aperture 50 to be admitted through the head tube 12 and into interior cavity 42 of cycle frame 10.

Second port 56 may extend away from rear face 46 of head badge 34. If head badge 34 is mounted to head tube 12, second port 56 may be sized to extend past the interior wall of the head tube 12. Further, second port 56 may be configured to guide cable 40 such that cable 40 does not touch the interior wall of head tube 12 and/or such that cable 38 does not touch the steerer tube of fork 14.

Second housing stop 62 may be configured to receive an end of second cable housing 64 without allowing second cable housing 64 to be admitted completely through second aperture 50. As such, cable 40 may pass through down tube 18 as bare cable.

As shown in FIG. 2, first and second apertures 48 and 50 may be located substantially on the same horizontal plane, however it will be appreciated that first and second apertures 48 and 50 may be arranged on different horizontal planes in other embodiments.

Turning now to FIGS. 4, 5, and 6, cable routing chuck 36 may be mounted within interior cavity 42 of the cycle frame 10. Cable routing chuck 36 may include registration area 66, cable reception guide 68, and cable routing guide 82. Cable routing chuck 36 may be configured to be affixed within interior cavity 42 of cycle frame 10 at the intersection of down tube 18 and chain stays 22, substantially adjacent to bottom bracket shell 24. Cable routing chuck 36 may be configured to divert one or more cables out of interior cavity 42. For example, cable routing chuck 36 may be configured to divert cable 38 through chain stays 22 before exiting interior cavity 42 and/or cable 40 may be diverted to exit interior cavity 42 substantially close to bottom bracket shell 24.

Registration area 66 may be configured to be affixed to mounting platform 70 within interior cavity 42 at the intersection of down tube 18 and chain stays 22. Registration area 66 may include aperture 72, which may allow screw 74 to pass through and affix cable routing chuck 36 to mounting platform 70.

When cable routing chuck 36 is affixed to mounting platform 70 within interior cavity 42, cable reception guide 68 may be configured to receive a cable extending to cable routing chuck 36 from within down tube 18. Further, cable reception guide 68 may be configured to receive two separate cables. For example, cable reception guide 68 may receive cable 38 and cable 40, extending to cable routing chuck 36 from within down tube 18. In this way, the cable 38 and cable 40 may be received by cable reception guide 68 in order to be routed to actuate various features of the bicycle. For example, cable 38 may actuate rear derailleur 32 and cable 40 may actuate front derailleur 28.

Cable routing guide 82 may include tail portion 76, and shoulder portion 78. Cable routing guide 82 may be configured to divert one or more cables out of interior cavity 42 of cycle frame 10.

Tail portion 76 may include curved cable track 80, which may be configured to divert a bare cable. For example, tail portion 76 may divert front derailleur cable 40 out of interior cavity 42 of cycle frame 10 to front derailleur 28 coupled to seat tube 30.

Shoulder portion 78 may include housing stop 84, which may be configured to receive an end of first cable housing 60. Shoulder portion 78 may be configured to divert bare rear derailleur cable 38 into first cable housing 60 and out of interior cavity 42 to rear derailleur 32, substantially near dropout 26 of cycle frame 10. In this way, rear derailleur cable 38 may be diverted by shoulder portion 78 to pass through chain stays 22 prior to exiting cycle frame 10 substantially near dropout 26.

The above description relates to a cable routing system for a bicycle. While the expressed description and figures relate to gear shift cables, the same configuration may be used to divert internal brake cables. For example, a cable routing chuck may include a cable track to route a brake cable for the rear wheel. Such a configuration would be advantageous for a rear disc brake, for example.

The disclosed cable routing system allows cables to be routed through the interior of a bicycle frame while minimizing contact between the one or more cables and the bicycle frame. Such an arrangement decreases vibration between the one or more cables and the bicycle frame. Thus, a rider may experience reduced noise due to vibration, particularly when navigating through rugged terrain. This offers a more enjoyable experience for the bicyclist and protects the cables from the surrounding environment.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A cable routing system for a cycle frame comprising:
    a cable routing head badge configured to be attached to a face of a head tube of the cycle frame, the cable routing head badge including two or more apertures, each aperture configured to receive a cable and admit the cable into an interior cavity of the cycle frame; and
    a cable routing chuck configured to be affixed within the interior cavity of the cycle frame at an intersection of a down tube of the cycle frame and chain stays of the cycle frame, the cable routing chuck configured to divert at least one cable out of the interior cavity of the cycle frame.

2. The cable routing system of claim 1, wherein said cable routing head badge includes a front face including an identification area; a rear face opposite said front face of said cable routing badge, said rear face having a shape configured to closely conform to said face of said head tube of the cycle frame when the cable routing head badge is mounted to the head tube of the cycle frame;

a first aperture extending through the front face of the cable routing badge and the rear face of the cable routing badge, the first aperture positioned to align with a first opening of the head tube of the cycle frame when the cable routing head badge is mounted to the head tube of the cycle frame so that a first cable extending from outside the cycle frame through the first aperture of the cable routing badge is admitted through the first opening into the interior cavity of the cycle frame; and a second aperture extending through the front face of the cable routing badge and the rear face of the cable routing badge, the second aperture positioned to align with a second opening of the head tube of the cycle frame when the cable routing head badge is mounted to the head tube of the cycle frame so that a second cable extending from outside the cycle frame through the second aperture of the cable routing badge is admitted through the second opening in said head tube into the interior cavity of the cycle frame.

3. The cable routing system of claim 2, where the second aperture includes a second port extending away from the rear face, the second port configured to extend into the second opening when the cable routing head badge is mounted to the head tube of the cycle frame, the second port sized to extend past an interior wall of the head tube when the cable routing head badge is mounted to the head tube of the cycle frame and configured to guide the second cable so that the second cable does not touch the interior wall of the head tube and/or such that the second cable does not touch a steerer tube of a fork in the head tube.

4. The cable routing system of claim 2, where the first aperture includes a first port extending away from the rear face, the first port configured to extend into the first opening when the cable routing head badge is mounted to the head tube of the cycle frame, the first port sized to extend past an interior wall of the head tube when the cable routing head badge is mounted to the head tube of the cycle frame and configured to guide the first cable so that the first cable does not touch the interior wall of the head tube and/or such that the first cable does not touch a steerer tube of a fork in the head tube.

5. The cable routing system of claim 2, where the first aperture includes a first housing stop configured to receive an end of a cable housing without allowing the cable housing to be admitted completely through the first aperture.

6. The cable routing system of claim 1, where the cable routing chuck includes a registration area configured to be affixed to a mounting platform within the interior cavity of the cycle frame at an intersection of a down tube of the cycle frame and a chain stays of the cycle frame; a cable reception guide configured to receive one or more cables extending to the cable routing chuck from within the down tube of the cycle frame when the cable routing chuck is affixed to the mounting platform within the interior cavity of the cycle frame; and a cable routing guide configured to divert the one or more cables out of the interior cavity of the cycle frame.

7. The cable routing system of claim 6, where the cable routing guide includes a tail portion including a curved cable track configured to divert a bare front derailleur cable out of the interior cavity of the cycle frame to a front derailleur on a seat tube of the cycle frame.

8. The cable routing system of claim 6, where the cable routing guide includes a shoulder portion including a housing stop configured to receive an end of a cable housing, the shoulder portion further configured to divert a bare rear derailleur cable into the cable housing and out of the interior cavity of the cycle frame to a rear derailleur on a dropout of the cycle frame.

9. A cable routing head badge comprising: a front face including an identification area; a rear face opposite said front face of said cable routing badge, the rear face having a shape configured to closely conform to a head tube of a cycle frame when the cable routing head badge IS mounted to the head tube of the cycle frame;

a first aperture extending through the front face and the rear face of said cable routing badge, the first aperture positioned to align with a first opening through said head tube of the cycle frame when the cable routing head badge is mounted to the head tube of the cycle frame so that a first cable extending from outside the cycle frame extends through the first aperture of said cable routing badge is admitted through said first opening of the head tube into an interior cavity of the cycle frame; and a second aperture extending through the front face and the rear face of the cable routing badge, wherein the second aperture is positioned to align with a second opening in the head tube of the cycle frame when the cable routing head badge is mounted to the head tube of the cycle frame so that a second cable extending from outside the cycle frame through the second aperture of the cable routing badge is admitted through the second opening in the head tube into the interior cavity of the cycle frame.

10. The cable routing head badge of claim 9, where the identification area is between the first aperture and the second aperture.

11. The cable routing head badge of claim 9, where the first aperture includes a first port extending away from the rear face, the first port configured to extend into the first opening when the cable routing head badge is mounted to the head tube of the cycle frame.

12. The cable routing head badge of claim 11, where the first port is configured to guide the first cable so that the first cable does not touch a wall of the head tube and/or such that the first cable does not touch a steerer tube of a fork in the head tube.

13. The cable routing head badge of claim 11, where the first port is sized to extend past an interior wall of the head tube when the cable routing head badge is mounted to the head tube of the cycle frame.

14. The cable routing head badge of claim 9, where the first aperture includes a first housing stop configured to receive an end of a cable housing without allowing the cable housing to be admitted completely through the first aperture.

15. A cable routing chuck comprising: a registration area configured to be affixed to a mounting platform within an interior cavity of a cycle frame at an intersection of a down tube of the cycle frame and chain stays of the cycle frame in an upper portion of a bottom bracket shell above a crank spindle;

a cable reception guide configured to receive a cable extending to the cable routing chuck from within the down tube of the cycle frame when the cable routing chuck is affixed to the mounting platform within the interior cavity of the cycle frame; and a cable routing guide configured to divert the cable above said crank spindle and out of the interior cavity of the cycle frame.

16. The cable routing chuck of claim 15, where the registration area includes an aperture configured to allow a screw to pass through and affix the cable routing chuck to the mounting platform.

17. The cable routing chuck of claim 15, where the cable reception guide is configured to receive two separate cables extending to the cable routing chuck from within the down tube of the cycle frame when the cable routing chuck is affixed to the mounting platform within the interior cavity of the cycle frame.

18. The cable routing chuck of claim 15, where the cable routing guide includes a tail portion including a curved cable track configured to divert a bare front derailleur cable out of the interior cavity of the cycle frame to a front derailleur on a seat tube of the cycle frame.

19. The cable routing chuck of claim 15, where the cable routing guide includes a shoulder portion including a housing stop configured to receive an end of a cable housing, the shoulder portion further configured to divert a bare rear derailleur cable into the cable housing and out of the interior cavity of the cycle frame to a rear derailleur on a dropout of the cycle frame.

\* \* \* \* \*